(12) United States Patent
Lingl et al.

(10) Patent No.: US 6,435,162 B1
(45) Date of Patent: Aug. 20, 2002

(54) METHOD AND APPARATUS FOR CHARGING AT LEAST ONE CAPACITIVE CONTROL ELEMENT

(75) Inventors: Wolfgang Lingl; Walter Schrod, both of Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 12 days.

(21) Appl. No.: 09/665,250

(22) Filed: Sep. 18, 2000

(30) Foreign Application Priority Data

Sep. 17, 1999 (DE) .......................... 199 44 734

(51) Int. Cl.⁷ .................. F02M 37/04; F02M 51/00
(52) U.S. Cl. ...................... 123/498; 123/490
(58) Field of Search ................. 123/498, 499, 123/490, 478; 310/316.03, 317

(56) References Cited

U.S. PATENT DOCUMENTS 6,016,040 A * 1/2000 Hoffman et al. ............ 318/116
6,121,715 A * 9/2000 Hoffman et al. ......... 310/316.03
6,137,208 A * 10/2000 Hoffman et al. ......... 310/316.03
6,147,433 A * 11/2000 Reineke et al. ......... 310/316.03

FOREIGN PATENT DOCUMENTS

| DE | 19632872 A1 | 2/1998 |
| DE | 19652801 C1 | 4/1998 |

* cited by examiner

*Primary Examiner*—Tony M. Argenbright
*Assistant Examiner*—Mahmoud Gimie
(74) *Attorney, Agent, or Firm*—Laurence A. Greenberg; Werner H. Stemer; Ralph E. Locher

(57) ABSTRACT

A method and an apparatus for charging at least one capacitive control element, in particular a fuel injection valve of an internal combustion engine, charge the capacitive control element with different charging times. In order to shorten a charging time, a charging process is interrupted at a predetermined time, and a tuned circuit is connected to a freewheeling circuit which contains the control element and a ringing or charge reversal coil. If the freewheeling circuit contains a further capacitor, the charging process is further shortened, and a portion of a charge energy is fed back into a charge source while the control element is being discharged.

7 Claims, 2 Drawing Sheets

METHOD AND APPARATUS FOR CHARGING AT LEAST ONE CAPACITIVE CONTROL ELEMENT

BACKGROUND OF THE INVENTION

Field of the Invention

The invention relates to a method for charging at least one capacitive control element, in particular a fuel injection valve of an internal combustion engine. The invention also relates to an apparatus for carrying out the method.

One of the advantages of actuating fuel injection valves of an internal combustion engine through the use of piezoelectric control elements instead of solenoids is the short switching time of the control elements. That leads to steep and very abrupt rates of change and only small variations in the amounts of fuel being injected. Charging times that are as short as possible are desired from the combustion design point of view.

In order to achieve a smoother combustion profile, the amount of fuel is split into an initial and a main injection amount, which allows slower combustion and thus a reduction in combustion noise. Until now, the control elements have been actuated with a constant charging and discharging time (duration of the charge reversal from an energy source to the control element or vice versa), which must be very short (for example 100 µs), to ensure that a predetermined initial in-jected amount of fuel can still be injected even in the upper-most load or speed range of the internal combustion engine.

The charging process is carried out, for example, as a ringing process with the charge from a charge source (a series circuit including a charge capacitor and a charge reversal capacitor) through a charge reversal coil to the control element. The inductance of the charge reversal coil together with the capacitances of the capacitors and of the control element determine the time constant for the charging and discharging processes (the charging and discharging times). Such an apparatus is disclosed in German Patent DE 196 52 801 C1, corresponding to U.S. Pat. No. 6,121,715.

However, the short charging times lead to high noise emissions in frequency bands which are unpleasant for human hearing. For example, in a motor vehicle, it is found to be very disturbing if the combustion noise is low when the internal combustion engine is idling.

SUMMARY OF THE INVENTION

It is accordingly an object of the invention to provide a method for actuating a capacitive control element of a fuel injection valve of an internal combustion engine that allows a considerable reduction in control element noise emission and an apparatus for carrying out the method that requires little component complexity, which overcome the hereinafore-mentioned disadvantages of the heretofore-known methods and apparatuses of this general type.

With the foregoing and other objects in view there is provided, in accordance with the invention, a method for charging at least one capacitive control element, in particular a fuel injection valve of an internal combustion engine, which comprises providing a tuned circuit having a capacitive charge source, a charge reversal coil and the at least one control element; dimensioning a capacitance of the charge source for a predetermined maximum charging time; and achieving a shorter charging time by prematurely disconnecting the tuned circuit at a specific time after a start of a charging process and switching over the tuned circuit in a freewheeling circuit having the charge reversal coil and the control element.

With the objects of the invention in view, there is also provided an apparatus for charging at least one capacitive control element, in particular a fuel injection valve of an internal combustion engine, comprising a series circuit including a charge source having a charge capacitor to be charged from an energy source and a charge reversal capacitor, a charging switch, a first diode connected to the charge reversal capacitor at a first junction point, a charge reversal coil connected to the charge reversal capacitor at a second junction point, and the at least one control element; a discharging switch connected to a reference ground potential; a second diode connected between the first junction point and the discharging switch and forward-biased toward the reference-ground potential; a third diode connected parallel to the charge reversal capacitor and forward biased toward the at least one control element; and a fourth diode connected between the reference ground potential and the second junction point and forward biased from the reference-ground potential toward the charge reversal coil.

Through the use of such an apparatus, the charging and discharging times of a capacitive control element, particularly in the low-load and idling range of the internal combustion engine, are varied by various measures during the charging process, for example in a range between 100 µs and 200 µs.

The achievement of the method according to the invention is that, in order to obtain shorter charging times (and thus smaller injected amounts), the current flowing during the charging process of the capacitive control element in the tuned circuit including capacitors, a charge reversal coil and a capacitive control element, is diverted into a freewheeling circuit, through the use of which the charging process is considerably shortened.

With regard to the choice of optimum charging times it can be said that: the duration of the charging time limits the minimum fuel injection duration. This is critical in particular with high injection pressures, since the injected amount of fuel rises with the fuel pressure, in proportion to the load, for the same injection duration. Ever shorter injection durations are thus required as the fuel pressure rises, in order to achieve a specific injected amount, in particular a small initial injected amount.

On the other hand, the injected amounts for the main injection are load-dependent and pressure-dependent. When the load is low, small injected amounts are required, but when the load is high, large injected amounts are required when the fuel pressure is high. This correlation between the amount of fuel and the fuel pressure allows longer charging times to be used for the main injection, in the high-load range as well.

Within certain limits, for example between 100 µs and 200 µs, and except for dead-time effects (delays at the start and end of injection) which can be compensated for by shifting the timing of the actuation signals, different charging times for a capacitive control element have no influence on the injection profile that is relevant for a combustion process.

Other features which are considered as characteristic for the invention are set forth in the appended claims.

Although the invention is illustrated and described herein as embodied in a method and an apparatus for charging at least one capacitive control element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
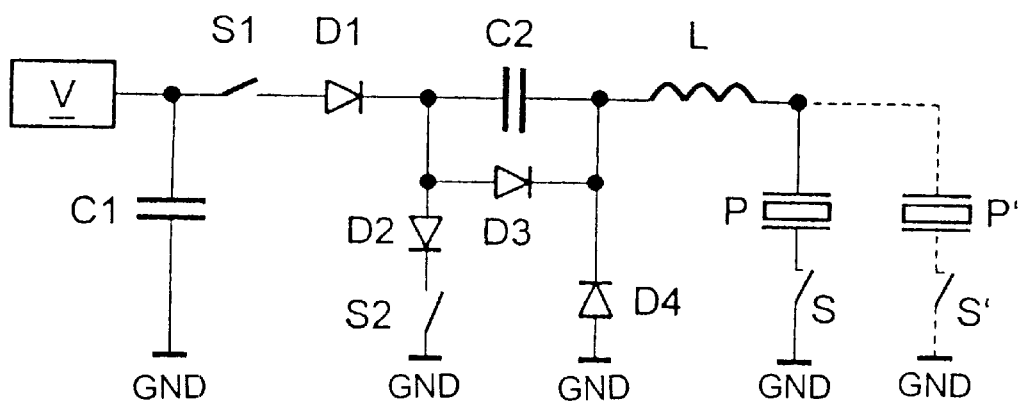
FIG. 1 is a schematic circuit diagram of a first exemplary embodiment according to the invention.

Referring now to the figures of the drawings in detail and first, particularly, to FIG. 1 thereof, there is seen a fundamental circuit of a known apparatus for charging and discharging a capacitive control element P, which is formed of a series circuit and two diodes D3 and D4. The series circuit is connected to a ground reference potential at both ends and includes a charge source (in this case a charge capacitor C1 which can be charged from an energy source V and a charge reversal capacitor C2), a charging switch S1, a first diode D1, a charge reversal coil L and one or more parallel-connected control elements P, P'. A respective selection switch S, S' is connected in series with each control element P, P'. A terminal or connection of the charge reversal capacitor C2 which leads to the charging switch S1 can be connected to a ground reference potential GND through a discharging switch S2 which is connected in series with a second diode D2. The two switches S1 and S2 are controlled by a non-illustrated control circuit ST. The capacitance of the charge capacitor C1 is assumed to be considerably greater than that of the charge reversal capacitor C2: C1>>C2.

When the terms "charging", "discharging" and "selection switches" are referred to, these terms preferably refer to switches which are switched on or off, for example thyristors or MOSFETs (with a diode connected in series if the current may flow in only one direction).

Figure 2:
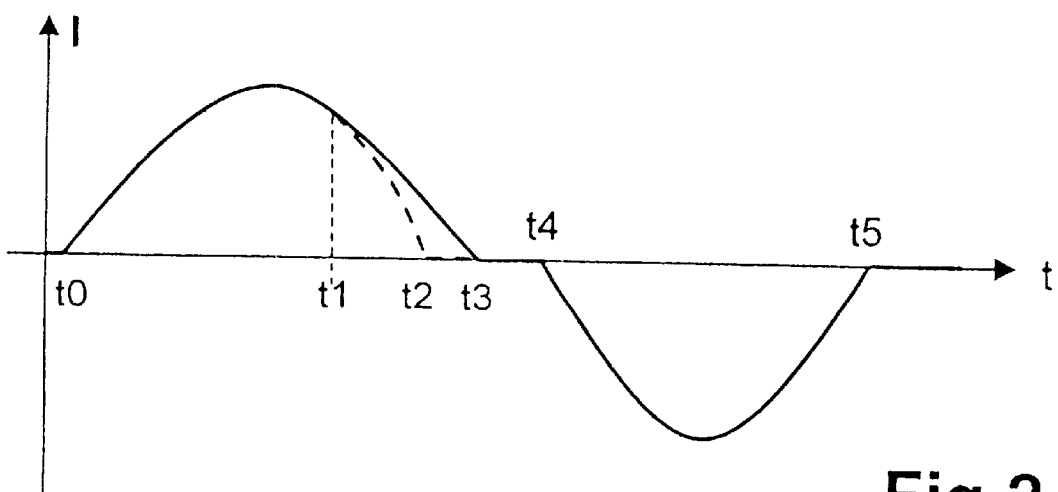
FIG. 2 is a graph showing charging and discharging current for the exemplary embodiment shown in FIG. 1.

In this known circuit, the control element P is charged by switching on the charging switch S1 and the selection switch S which is associated with the control element, at a time t0 shown in FIG. 2. In this case, the charge previously supplied to the capacitors C1 and C2 oscillates with a current I in the form of a half sinusoidal oscillation (solid curve in FIG. 2) from these two capacitors through the charge reversal coil L to the control element P. During this time, the charging time, a control element voltage U rises to a specific value, and the control element P opens the fuel injection valve.

When the current I becomes zero at a time t3, the charging switch S1 is switched off once again, and the control element voltage U remains at this level until a discharging process starts with the discharging switch S2 being switched on at a time t4. The charge then oscillates from the control element P through the charge reversal coil L into the charge reversal coil C2. The control element voltage U returns to zero, the current I becomes zero at a time t5, the fuel injection valve is closed by the control element P, and the discharging switch S2 is switched off. The selection switch S must be switched off once again before the next charging process if it is subsequently intended to actuate another control element. This ends one injection process. A reversal charging into the charge capacitor C1 is prevented by the first diode D1.

Insertion of a third diode D3 (which is forward biased in the direction of the charge reversal coil L) in parallel with the charge reversal capacitor C2, and a fourth diode D4 (which is forward biased to the charge reversal coil L) between the reference ground potential GND and a junction point of the charge reversal capacitor C2 and the charge reversal coil L, results in the circuit shown in FIG. 1, which is a first exemplary embodiment according to the invention.

The way in which this circuit operates is explained in the following text with reference to the graph of the current profile I in the control element P, shown in FIG. 2.

As in the case of this known circuit, the charging switch S1 and the selection switch S are switched on simultaneously at the time t0, as a result of which the control element P is charged through the charge reversal coil L from the previously charged capacitors C1 and C2, and a sinusoidal current I starts to flow through the control element P. If both switches S1 and S (solid curve) remain switched on until the current I becomes zero at the time t3 then, as in the known circuit, the charging time is once again, for example, t3−t0=200 μs.

Now, according to the invention, in order to achieve a shorter charging time, the charging switch S1 is switched off prematurely at the time t1. In consequence, the circuit for the current I flowing through the charge reversal coil L is now closed through the control element P and the fourth diode D4. As a result thereof, the current I (dashed curve) falls quickly, and becomes zero at the earlier time t2. As a result of this measure, which at the same time represents freewheeling for the charge reversal coil L, the charging time is shortened. Its duration is now only t2−t0. In this way the end of the charging time, which starts at the time t0, may vary between t1 and t3, as a result of which it is possible to choose charging times from 100 μs to the chosen maximum, in this case 200 μs.

As has already been described above, the discharging of the control element P starts at the time t4 and ends at the time t5.

As a result of the shortened charging time, which ends at the time t2, discharge of the control element P can actually start at the time t4=t2 when a minimum amount of injected fuel is being demanded of the fuel injection valve.

The respective selection switch, S or S', must be switched on at least from the start (t0) of the charging time to the end of the discharging time (t5).

Figure 3:
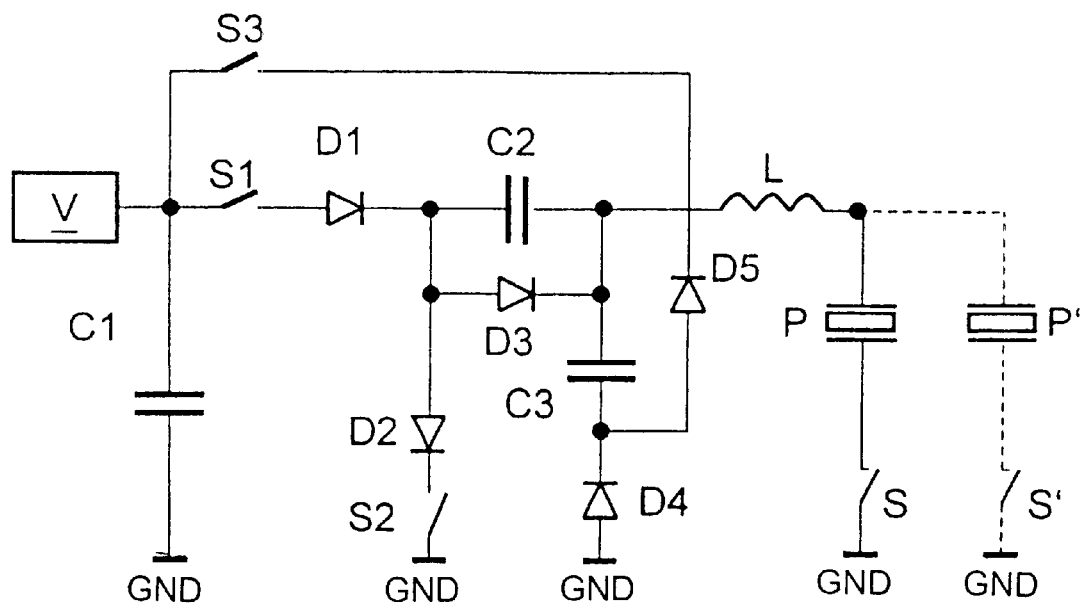
FIG. 3 is a circuit diagram of a second exemplary embodiment according to the invention.

FIG. 3 shows a fundamental circuit of a second exemplary embodiment according to the invention, which differs from the circuit shown in FIG. 1 in that a fifth diode D5, biased in the same direction, is connected in series with the fourth diode D4 and can be connected through a switch S3 to the charge capacitor C1. In addition, a further capacitor C3 is connected between the fourth diode D4 and the charge reversal capacitor C2.

Figure 4:
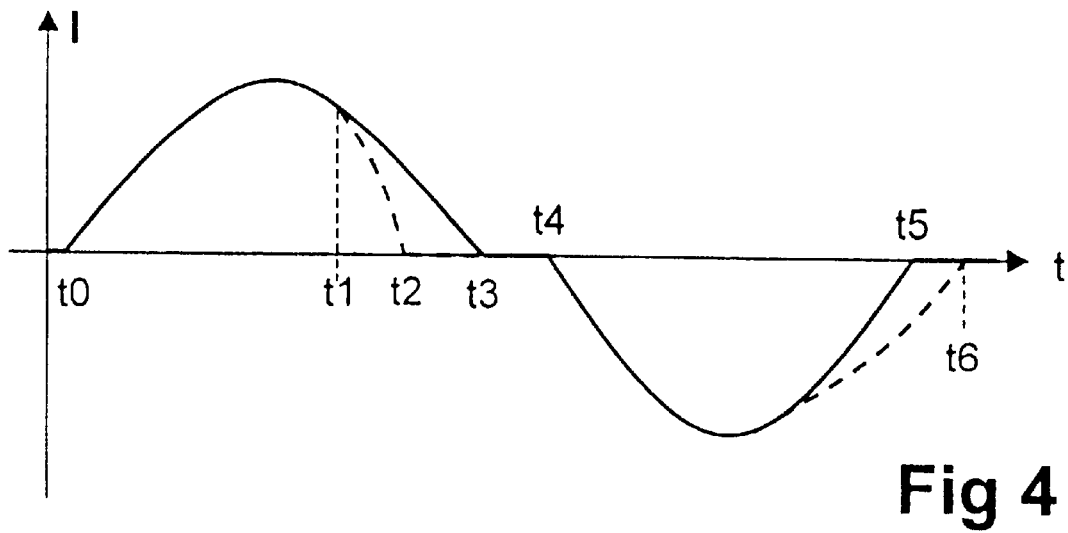
FIG. 4 is a graph showing the charging and discharging current for the exemplary embodiment shown in FIG. 3.

This circuit, the function of which will be explained below with reference to FIGS. 3 and 4, allows at least a portion of the energy which is stored in the charge reversal coil L at the instance when the charging process is prematurely terminated, to be buffer-stored in the further capacitor C3. That speeds up the freewheeling and thus the termination of the charging process. During subsequent discharging of the control element P, the buffer-stored energy is fed back into the charge capacitor C1, as will be explained in the following text.

The charging process takes place in the same way as in the exemplary embodiment according to FIG. 1. The charging switch S1 is switched on at the time t0, as a result of which the control element P is charged through the charge reversal coil L from the series circuit formed by the charge capacitor C1 and the charge reversal capacitor C2. A sinusoidal current I starts to flow through the control element P, which has been selected by the selection switch S. Unless the charging process is interrupted, it ends at the time t3.

In order to achieve a shorter charging time, the charging switch S1 is switched off again prematurely at the time t1. In consequence, after this time, the current flows from the charge reversal coil L to the control element P and from there through the selection switch S, the fourth diode D4 and the further capacitor C3 back to the charge reversal coil L, until this current becomes zero at the time t2 (dashed curve from t1 to t2 in FIG. 4). The intermediate, further capacitor C3, which is initially uncharged and in which that portion of the energy which is stored in the charge reversal coil L and is not stored in the control element is buffer stored, results in a tuned circuit with a different time constant, which can be influenced by the capacitance of the further capacitor C3. In consequence, the charging time of the control element is ended more quickly than in the exemplary embodiment shown in FIG. 1.

During the discharging of the control element P, starting at the time t4, the discharging switch S2 and, in synchronism therewith, the further switch S3, are switched on. In consequence, the control element P is initially discharged through the charge reversal coil L into the charge reversal capacitor C2 until the sum of the voltages across the charge reversal capacitor C2 and across the further capacitor C3 is greater than the voltage across the charge capacitor C1. At that point the further capacitor C3 is then discharged into the considerably larger charge capacitor C1. In consequence, the discharging time, which in the exemplary embodiment shown in FIG. 1 would have ended at the time t5, is lengthened slightly to a time t6 (dashed curve in FIG. 4).

After the end of the discharging process, the initial conditions for the next control element charging process are satisfied once again. The voltage across the charge reversal capacitor C2 is equal to the voltage across the charge capacitor C1, and the further capacitor C3 is not charged.

We claim:

1. In a method for charging at least one capacitive control element, the improvement which comprises:
   providing a tuned circuit having a capacitive charge source, a charge reversal coil and the at least one control element;
   dimensioning a capacitance of the charge source for a predetermined maximum charging time; and
   achieving a shorter charging time by prematurely disconnecting the tuned circuit at a specific time after a start of a charging process and switching over the tuned circuit in a freewheeling circuit having the charge reversal coil and the control element.

2. The method according to claim 1, which comprises providing a fuel injection valve of an internal combustion engine as the at least one capacitive control element.

3. In an apparatus for charging at least one capacitive control element, the improvement comprising:
   a series circuit including a charge source having a charge capacitor to be charged from an energy source and a charge reversal capacitor, a charging switch, a first diode connected to said charge reversal capacitor at a first junction point, a charge reversal coil connected to said charge reversal capacitor at a second junction point, and the at least one control element;
   a discharging switch connected to a reference ground potential;
   a second diode connected between said first junction point and said discharging switch and forward-biased toward the reference-ground potential;
   a third diode connected parallel to said charge reversal capacitor and forward biased toward the at least one control element; and
   a fourth diode connected between the reference ground potential and said second junction point and forward biased from the reference-ground potential toward said charge reversal coil.

4. The apparatus according to claim 3, wherein the at least one capacitive control element is a fuel injection valve of an internal combustion engine.

5. The apparatus according to claim 3, including:
   a further capacitor connected between said fourth diode and said second junction point;
   a fifth diode connected in series with said fourth diode; and
   a further switch for connecting said fifth diode to said charge capacitor.

6. The apparatus according to claim 3, wherein said further switch is switched on and off in synchronism with said discharging switch.

7. The apparatus according to claim 5, wherein a capacitance of said charge capacitor is considerably greater than a capacitance of said charge reversal capacitor, and a capacitance of said further capacitor is less than a capacitance of said charge reversal capacitor.

* * * * *